United States Patent [19]

Cousin

[11] 4,144,682
[45] Mar. 20, 1979

[54] TOPOGRAPHIC BENCH MARK

[76] Inventor: Gilbert Cousin, 9/6, rue de La Loire, Lille (Nord), France

[21] Appl. No.: 787,968

[22] Filed: Apr. 15, 1977

[30] Foreign Application Priority Data

Apr. 22, 1976 [FR] France .................................. 76 12483

[51] Int. Cl.² .............................................. L01F 9/02
[52] U.S. Cl. ........................................ 52/103; 109/51
[58] Field of Search ................... 52/103, 104; 109/51, 109/50, 52; 404/9

[56] References Cited

U.S. PATENT DOCUMENTS

| | | | |
|---|---|---|---|
| 384,855 | 6/1888 | Kidney | 109/51 |
| 427,394 | 5/1890 | Brown | 52/109 |
| 727,105 | 5/1903 | Dodson | 109/51 |
| 2,038,962 | 4/1936 | Schulthess | 52/103 |
| 2,624,307 | 1/1953 | Caffrey | 52/103 |
| 2,674,353 | 4/1954 | Foote | 52/103 |
| 3,503,163 | 3/1970 | Lutz | 52/103 |
| 3,561,317 | 2/1971 | Rowell | 85/61 |
| 3,587,486 | 6/1971 | Henrichs | 109/51 |
| 4,029,370 | 6/1977 | Ziegel | 109/51 |

Primary Examiner—Ernest R. Purser
Assistant Examiner—H. E. Raduazo
Attorney, Agent, or Firm—Robert E. Burns; Emmanuel J. Lobato; Bruce L. Adams

[57] ABSTRACT

A topographic bench mark unit comprises a case which defines internally a space accessible through a movable lid. The case is mounted on a support. A bench mark member is integral with the case within the space. Provision is made for mounting a topographic member in a predetermined position in relation to the bench mark point, with a view to producing measurements referring to this point, and means for identifying the bench mark point. The unit has application both to immovable altimetric and geodetic bench marks.

17 Claims, 4 Drawing Figures

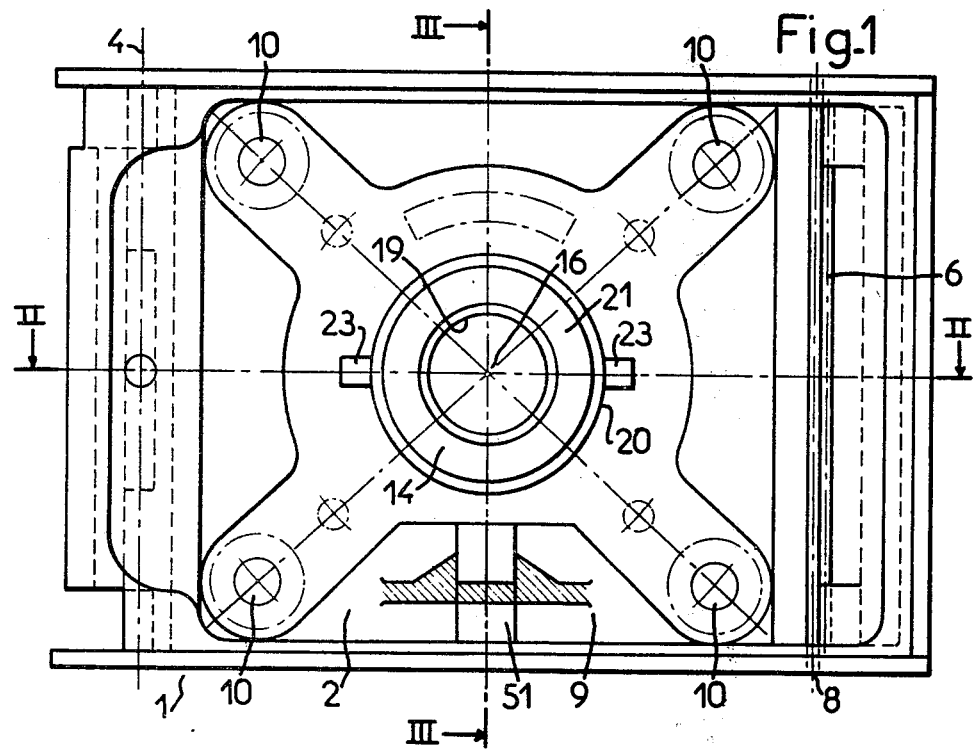
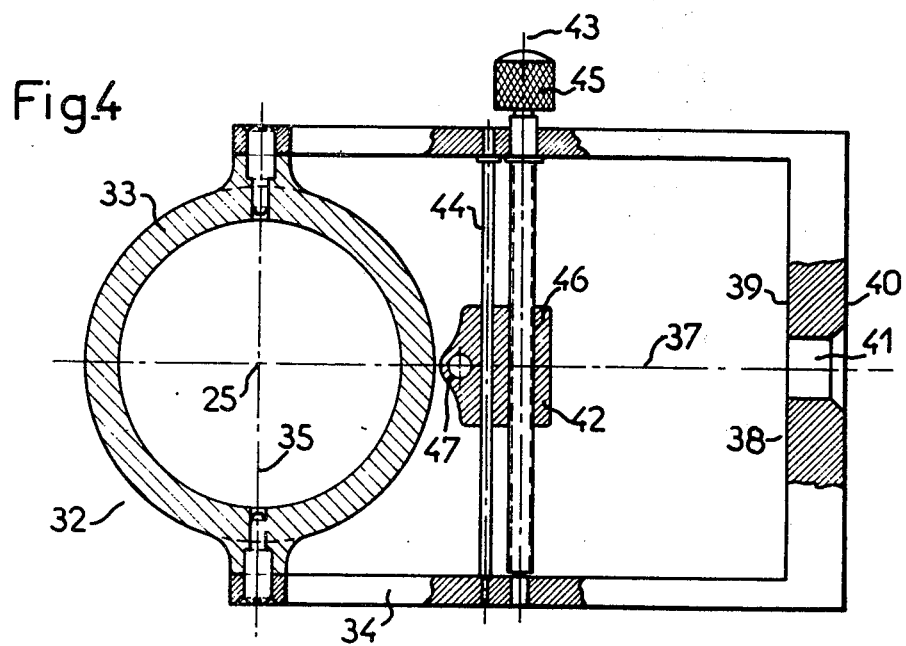

TOPOGRAPHIC BENCH MARK

The invention relates to a topographic bench mark member. The topographic bench mark member comprises a case which defines internally a space which is accessible through a movable lid, means for mounting the case to a fixed support, a bench mark member which is integral with the case within said space, means for mounting a topographic member in a predetermined position in relation to the bench mark point, with a view to producing measurements referring to this point, and means for identifying the bench mark point.

It has application both to immovable altimetric and geodetic bench marks.

BACKGROUND OF THE INVENTION

The present invention relates to a topographic or topometric bench mark unit.

It is well known that the function of topographic bench marks is the permanent provision over an area, of points which are defined geometrically both geodetically and vertically in a general system of coordinates, in order to permit the incorporation into the general system, by simple topographical operations, of surveys carried out within the area with a view to facilitating works such as the positioning of canals and other engineering work.

The general system is marked by various points whose geodetic coordinates (x and y) are known relative to known axes corresponding to the cartographic representation system used in the area under consideration (the Lambert system for France), and whose vertical cordinate or altitude (z) is known relative to a level defined by a local network of bench mark points in the area under consideration which in turn is known relative to an overall level for, for example, France.

A distinction is generally made at present between horizontal (geodetic) and vertical bench mark members. When they correspond at points of the geodetic map, which constitute a national framework, these bench mark members are generally mural and are often composed of a sealed plate on the front of a building or other construction, at a low height in the case of the vertical bench mark members or at a considerable height in the case of geodetic triangulation bench mark members.

The latter can also comprise boundary marks implanted in the ground, if beyond build-up areas, and natural points such as church crosses and so on.

In order to link local surveys to the geodetic outline map, one can increase the density of the surveyed points by marks placed on the ground, or by stakes, nails or pins planted in the ground or even by sealed bench mark members at the boundary marks which are cast on site.

These various types of bench mark members have the double disadvantage of not being immovable, since they can easily be dislodged or destroyed, and of only being able to be produced in a succinct form because of their vulnerability, which limits their role to that of bench mark members on which a topographic member (eg: a theodolite) may be inaccurately placed.

One sometimes also resorts, for geodetic surveying, particularly in an urban area, to a system of natural points such as architectural details marked photographically and catalogued. Such a method is difficult to manage, because of the number of photographs necessary to produce an outline map having an adequate density of points and because of difficulties in recording the marked points, which moreover complicate the marking of elements relating to identification and inscription of points. One encounters, moreover, difficulties in ensuring an accurate mounting for the topographic member in relation to the marked points.

SUMMARY OF THE INVENTION

An object of the present invention is to remedy these disadvantages of topographic bench marks used at present, by providing an immovable bench mark member, making possible the fixing of accessories in order to make surveys easier and more accurate, and the mounting of which is easy.

A second object of the invention is to provide a bench mark which is geodetic and altimetric at one and the same time, in order to simplify surveys by eliminating separate reference to geodetic bench marks and to different altimetric bench marks, as often practised at present, which complicates operations considerably.

The present invention provides a topometric bench mark unit comprising a case defining internally a space which is accessible by means of a lid, means for fixedly mounting the case to a fixed support, a bench mark member which is integral with the case inside said space, means for mounting a topometric member in a predetermined position in relation to the bench mark point, for producing measurements with reference to the bench mark point and means for identifying the bench mark point.

By providing the bench mark member on the inside of a case provided with a lid we reduce the risk of deterioration as a result of bad weather, accident or deliberate vandalism; the case is, moreover, fixed to a support such as the front of a building, by the intermediary of means which are not accessible from the outside and the possible tampering with which can easily be disclosed, which permits the users to confirm any possible displacement in relation to the support, whether accidental or otherwise.

Being well protected in its case, the part forming the bench mark member can, moreover, have a more complicated shape than usual, and in particular, have a shape which is suitable for fixing, in a position determined in relation to the bench mark point, a topographic member, with the aim of producing measurements referring to this point. To this end, there has been provided, an accessory which is fixable to the case and is intended to act as an intermediary between the latter and the topographic member, this accessory being provided in such a way as to be orientable in relation to the bench mark point, so as to define an axis which is perfectly vertical and passes through the bench mark point.

The definition of such a vertical axis is necessary in numerous measurements and, for example, when the survey station is linked by tachometer measurement to the general system of coordinates provided by the network of bench marks on site.

The removable accessory which acts as an intermediary between the bench mark member and the topographic member used, which in the example comprises the measuring device of a tachometer, produces an accurate mounting for the topographic member, whatever its space requirement may be, in a definite and precise geometric "eccentric" position relative to the bench mark point, this being in order to permit suitable calculation.

In the example chosen, and according to the relative position of the survey station, that is to say, of the point on the vertical of which the principal axis of rotation of the tachometer in position is situated, and of the bench mark sighted for the linking up, and according to the surveying conditions (presence of obstacles obstructing visibility), the offsetting should appear in three forms:

bench mark on the left of the line joining the survey station to the point of the aimed device, sighting mark or reflecting prism, which is integral with the intermediate accessory and to which the measurements relate, bench mark in the extension of this line, bench mark on the right of this line.

These three positions are possible by a rotation of the aimed device about its center, which is on the vertical axis of the known bench mark point, and by its constant radius in a horizontal plane, or "mechanical offsetting constant".

Whatever the geodetic offsetting figure may be, the point of the aimed device to which the measurements relate, that is to say, the sighting mark or the reflecting prism in the example chosen, always remains situated at an identical known level relative to the bench mark point because of the presence of the intermediate accessory, which defines an axis which is perfectly vertical and passes through the bench mark point.

The negligible mechanical complexity of the shape of the bench mark member, which is ensured by its protection, thus permits various accessories to be adapted to it, which are intended to facilitate and improve the precision of topographic survey operations which are undertaken either to define the position of the bench mark point in the general system when it is put in place, or to link local surveys to the general system when the bench mark member is in normal use thereafter.

Finally, it must be noted that the intermediate accessory for fixing the topographic member to the bench mark member is preferably produced in a removable form, the bench mark member having a simple shape and being small; in practice it may be of a similar size to that of the postal address plate with which buildings may be equipped, and can easily be substituted for the latter, since it is also possible to put on it, for example, on the lid, all the instructions which traditionally appear on the address plate known at present.

BRIEF DESCRIPTION OF THE DRAWINGS

The invention will be better understood if reference is made to the description below, which relates to a preferred embodiment of the topographic bench mark member, and also to the attached drawings in which:

FIG. 1 shows a front view of an embodiment of the invention, the case having its lid removed.

DESCRIPTION OF THE PREFERRED EMBODIMENT

Figure 2:
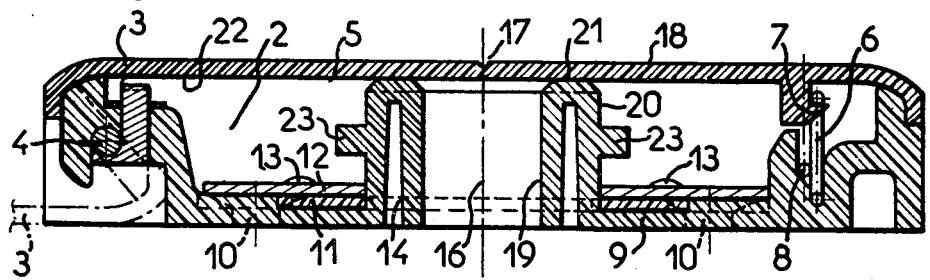
FIG. 2 shows a view of the topographic in section through the substantially horizontal plane II—II in FIG. 1, the box being closed.

In this example, a case 1 of the topographic bench mark member has the general shape of a flat right-angled parallelepiped arranged substantially vertically, and defining internally a space 2 which is accessible by means of a movable lid 3, which defines in the closed position illustrated in FIG. 2, one of the large vertical surfaces of the case.

The lid 3 is mounted on the case 1, so as to rotate about an axis 4 which is substantially vertical, the assembly being arranged in such a way that in the open position, sketched in chain-dotted lines in FIG. 2, the lid 3 which forms the front surface 5 of the case completely disengages from the case 1.

As FIG. 2 shows, the lid 3 is maintained in the closed position by a device which is accessible from the outside by a key and comprises, for example, in known manner, a semi-rigid and elastically deformable element such as a metallic wire 6, which is looped and is attached to the back 9 of the case 1, and is engaged around a lug 7 of the lid 3, which, when the lid 3 is closed is directed inwards towards the space 2; the key, which is introduced, for example, vertically through an aperture 8 located in the lower face of the case 1, thrusts aside the spring 6 when it is turned, in such a way as to disengage it from the lug 7. Naturally, other locking devices could be used.

In the example illustrated, the back 9 of the case, which corresponds to the second large surface of the parallelepiped which is orientated vertically, is intended to be placed and fixed against a support such as the front face of a building. To this end, the back 9 has support means, for example, means defining apertures 10, which pass right through it, and for passage through the apertures fixing members such as screws, which are anchored outwards in the support and whose heads are placed against the back 9, inside the space 2. It must be noted that in this way the screws or any other equivalent fixing members remain inaccessible from the outside of the case when the opening key is not available.

Means have nevertheless also been provided which indicate a possible tampering with the bench mark member, either by pulling away and disengagement from the support or after opening the case.

One can, for example, provide for this purpose, a sealed wire joining the heads of the fixing members such as the screws, or any other equivalent device, but another particularly simple and efficient preferred type of device has been represented in the Figures.

In the example illustrated, the heads of the fixing members are inserted between two plates 11 and 12, the first of which is placed directly against the back 9, on the inside of the space 2, and acts as a support for the heads of the fixing members, and the second of which is superposed on the first and over the heads of the fixing members, and is joined with the first by means which are destroyed or damaged in the event of relative displacement of the fixing members and of the case: in the example illustrated, the joint between the two plates 11 and 12 is ensured by the lugs 13, which are integral with the plate 11 and pass right through the plate 12, over which they are flattened like a rivet, for example, by heating, if the plate 11 is produced from a thermoplastic material.

The plate 12 thus denies access to the heads of the fixing members even when the case is open, unless destruction of the lugs 13 or the equivalent members occurs; it should be noted that in view of the presence of the plate 11, the case itself has not been damaged by the destruction of the lugs 13 or by the pulling out of the fixing members on the support, and that it can consequently either be dismantled at will, or re-used after being tampered with, only the plates 11 and 12 then having to be changed.

On the inside of the case 1, protected by the lid 3 when the latter is closed, the topographic bench mark member according to the invention comprises a bench mark member 14, which is integral with the back 9 of the case and located substantially centrally of the latter.

In the example illustrated, this member 14 brings about the mounting of a topographic member in a predetermined position in relation to the bench mark point itself, with a view to producing measurements referring to this point.

In practice, the bench mark member 14 has a shape which is suitable for ensuring the centering and stowing or mounting of an intermediate accessory 15, which will be described further by reference to FIGS. 3 and 4.

To this end, the bench mark member 14 appears here in the form of a cylindrical sleeve which is integral with the back 9 of the case and has a substantially horizontal axis 16 passing through point 17 of front surface 5, the point 17 being the bench mark point itself.

In order to allow rapid measurements even when the lid 3 is closed, this point 17 is marked on the outside surface 18 of the lid to be irsible when the latter is in the closed position; it can be indicated, for example, by a notch dug into this surface 18 at the intersection with the axis 16.

With the object of centering accessories about the axis 16 and the point 17, the bench mark member 14 here has two cylindrical surfaces 19 and 20, which are coaxial and of a smaller and larger diameter respectively, connected opposite the back 9 by an annular surface 21 which is in contact with the inside surface 22 of the lid when the latter is closed.

In order to produce a "bayonet" type mounting for an accessory 15, the external cylindrical surface 20 of the casing (sleeve) carries two lugs 23 projecting outwards in diametrically opposite positions.

The mounting means accessory 15 has, integral with a manipulating handle 24, rotatable about an axis 25 which is coincident with the axis 16 when the accessory 15 is in place on the bench mark member 14, a sleeve 26 having an internal cylindrical surface 27 whose axis coincides with axis 25 and having a diameter which is close to that of the surface 20 of the bench mark member 14, and on the inside of the sleeve 26, a centering boss 28 having, from its part, a cylindrical external surface 29 whose axis coincides with the axis 25 and has a diameter which is close to that of the internal surface of the bench mark member 14.

Chamfers are arranged at the junction of the different surfaces of the bench mark member 14 and of the handle 24 to cooperate in order to facilitate mutual engagement.

The sleeve 26 of the handle 24 has on the inside notches which are complimentary to the lugs 23 of the bench mark member 14, in order to produce a "bayonet" type fixing (these notches are not shown).

In order to improve the behavior of the bayonet fixing, a ring 30 of compressed elastic material is inserted between opposite surfaces of the handle 24 and of the bench mark member 14 orientated transversely in relation to their respective axis, for example, between the surface 21 of the member 14 and its counterpart 31 connecting the surfaces 27 and 29 of the handle 24.

Besides the fixing handle 24, the intermediate accessory 15 comprises a a movable part 32, which is intended to carry the topographic member which it is desired to mount, on the bench mark member.

The movable part 32, which is also described by reference to FIG. 4, comprises an annular ring 33 and a stirrup 34, which is mounted so as to rotate on this ring about an axis 35 which is orientated along a diameter of the latter.

Figure 3:
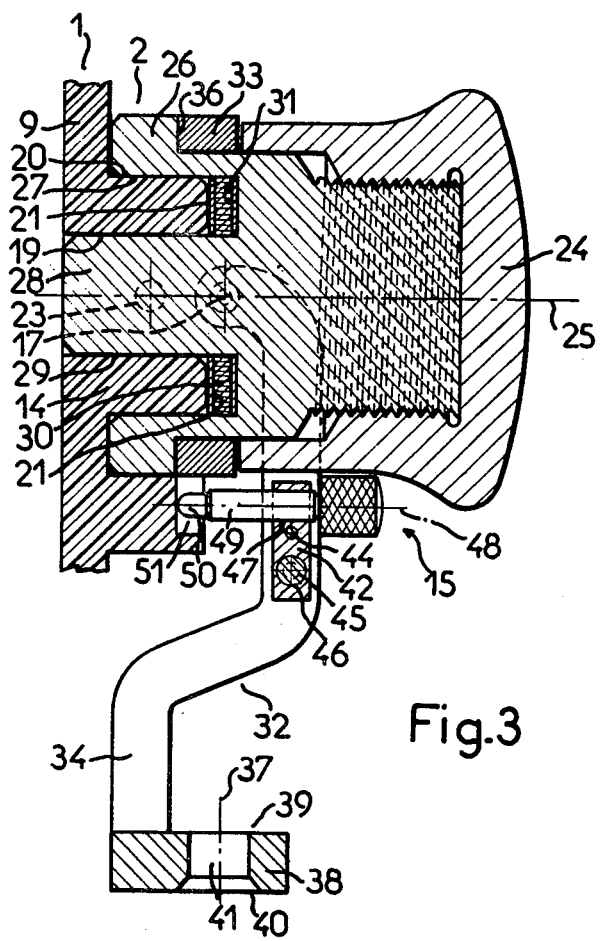
FIG. 3 shows a sectional view along the substantially vertical plane III—III of FIG. 1, after centering and fixing of an intermediate accessory to the topographic bench mark member, and, FIG. 4 shows a plan view, in partial section of the intermediate accessory.

As FIG. 3 shows, the annular ring 33 is engaged in a groove of complementary shape 36, which is annular and coaxial with the axis 25 of the handle 24 and located on the external periphery of the sleeve 26; the ring 33, like the stirrup 34, is thus mounted so as to rotate freely about the axis 25, and consequently, about the axis 16, when the accessory 15 is in position on the bench mark 14.

The position of the groove 36 on the handle 24 and the position of the axis 35 of the ring 33 are such that in this position of the device the axis 35 passes through the point 17. In other words, the point of intersection of the axis 25 of rotation of the ring 33 about the handle 24 with the axis of rotation 35 of the stirrup 34 on the ring 33, is situated at the bench mark point 17 when the handle 24 is centered and stowed or mounted on the bench mark member 14.

Consequently, a given line 37 fixed in relation to the stirrup 34 and passing through the point of intersection of the two axes 35 and 25, constantly passes through this point, and consequently, through the point 17 in the use position of the device, whatever might otherwise be the position of the ring 33 about its axis of rotation 25 and the position of the stirrup 34 about its axis of rotation 35.

There has been chosen in the example illustrated, a line 37 which is perpendicular to the axis 35 of articulation of the stirrup 34 on the ring 33; the stirrup 34 comprises means for fixing the topographic member to be mounted so as to be able to revolve about the line 37, which can be of any known type and are composed here of a plate 38 having two surfaces 39 and 40 perpendicular to the line 37 and an aperture 41 to receive a lug which is integral with the topographic member to be mounted (not represented here).

As the possible rotation of the topographic member about the bench mark has to be effected about a strictly vertical axis, as has been stated above, means are provided to place the line 37 in this accurately vertical position adjusted by means of a level which is fixed by any means to the stirrup 34 and not represented here. To this end, means are provided to adjust the rotation of the ring 33 about the axis 25 and that of the stirrup 34 about the axis 35, when the intermediate accessory 15 is in position on the bench mark member 14. There has thus been provided on the stirrup 34, a saddle 42, which can be integral with this stirrup but is shown adjustable on it in a line 43 which is parallel to the axis 35. The saddle 42 is, for example, mounted so as to slide on a rectilinear guide rod 44 which is integral with the stirrup 34 and orientated parallel to the line 43, the adjustment of the position of the saddle 42 along this rod being itself ensured by a lead screw 45 whose axis coincides with the line 43 and which is engaged in a threaded housing 46 of the saddle 42 in such a way that a rotation of the screw in one direction or the other produces a displacement of the saddle 42 along the rod 44, following the line 43, in one direction or the other.

The saddle 42 is pierced by a second threaded aperture 47, whose axis 48 is orientated perpendicularly to the axis 35 but is not concurrent with the latter. Into this aperture 47 there is screwed an adjusting screw 49 ending in a finger 50 extending towards the back 9 of the case 1, when the accessory 15 is in position on the bench mark 14, and engaging in a notch 51 in the back 9 of the case below the bench mark member 14 and perpendicular to the axis 16 of the latter when the case is fixed to its support (see also FIG. 1).

Thus, by adjusting the two adjusting screws 45 and 49, the finger 50 of the screw 49 being engaged in the notch 51, one ensures an adjustment of the line 37 of the stirrup 34 about the axis 25, that is to say the axis 16, and about the axis 35, respectively, thus preserving alignment with the point 17, until this line 37 is accurately vertical as indicated by a level; all the traditional measurements in altimetry or geodetics can then be effected by fixing to the stirrup 34, via the aperture 41 centered on the line 37, a topographic member in the form of any sighting and measuring member such as a level, for example, or any aimed accessory such as a reflector, surveyor's rod, etc., the counter-part of this member being placed at a distance.

These various topographic members will occupy a predetermined geometrical position in relation to the point 17, which is calculable in relation to this point (and possibly in relation to other bench marks), and thus produce very precise measurements.

In order to facilitate identification of the bench mark point on site, there have been provided means for registration and identification of the bench mark point which can be carried externally, for example, on the outside surface 18 of the lid 3, like the point 17 and/or on the outside of the case and, for example, on the plate 12 which indicates tampering, since the intact or deteriorated condition of this plate testifies to the validity or non-validity of the registration, respectively.

In the same way, the coordinates x and y and the altitude z of the point can be transferred to the plate 12 or inserted between the plates 11 and 12 before fitting of the plate 12 which comprises a visualisation window forming a label, in order to avoid any possibility of untimely access to these coordinates.

Registration can naturally be carried out by any known means, for example, by means of figures integral with the lid, with the plate 12 or with any other element of the bench mark member, by sticking or by welding; one can also resort to direct marking, if the material lends itself to it, or even to the fixing of an address plate obtained by any process.

The topographic bench mark apparatus according to the invention can be produced from any material. It could be produced, for example, at least as far as the case 1 and its lid 3 are concerned, from a thermo-setting resin which is preferably shock resistant; a more fragile and thermo-plastic substance will be preferred for the plates 11 and 12. The movable part 32 of the intermediate accessory 15 will, for its part, preferably be produced from metal, these materials naturally being quoted only by way of purely explanatory example.

We claim:

1. A topometric bench mark unit, comprising;
a bench mark member, having disposed and marked thereon a bench mark point defining in use, a center of topometric reference system corresponding to a territory;
mounting means received on said bench mark member for mounting, in use, a topometric element on the bench mark member in a position predetermined relative to the bench mark point to permit measurements to be carried out with the topometric element, relative to said point and reference system;
a flat casing defining a space internal thereof, the case having a back and having, in use, said bench mark member rigid with said back in said space, and having means for identifying the bench mark member;
a lid movably mounted on the case for providing access to the bench mark member in said space; and
support means for fixed mounting of the back of said case on a surface of a structure in the territory.

2. A unit according to claim 1, additionally including;
control means inside said case and visible when the lid is open for evidencing any tampering with the fixed mounting of the case on said structure, the control means being incorporated in the support means so that the tampering visibly deforms the control means.

3. A topographic bench mark unit, comprising;
a flat case having a back and defining internally a space;
a movable lid providing access to the space; means fixedly securing the back of said case on a surface of a structure, the securing means including means in said case for rendering any tampering with the fixed mounting visible; a bench mark member integral with the back of said case and inside said space, said bench mark member having a cylindrical surface the axis of which passes through a bench mark point; means for mounting a topographic member in a predetermined position in vertical alignment with the bench mark point defined by the bench mark member, for producing measurements with reference to the bench mark point; and means for identifying the bench mark point; the means for mounting the topographic member comprising, a removable intermediate accessory between the topographic member and the case, there being, on the intermediate accessory, a cylindrical surface complementary to and coaxial with the cylindrical surface of said bench mark member in the case, and one of the cylindrical surfaces being mounted within the other.

4. A topographic bench mark unit as claimed in claim 3 including means for locking the lid in at least one closed position.

5. A topographic bench mark unit as claimed in claim 3 in which the supports for fixedly mounting the case is inaccessible from the outside of the case when the lid is closed.

6. A topographic bench mark unit as claimed in claim 3 in which the identifying means comprises marks identifying the position of the bench mark point.

7. A topographic bench mark unit as claimed in claim 3 in which the means for mounting the topographic member comprises a means for centering the topographic member relative to the bench mark point.

8. A topographic bench mark unit as claimed in claim 3, in which the means for mounting the topographic member comprises means for mounting the intermediate accessory in vertical alignment with the bench mark point.

9. A topographic bench mark unit as claimed in claim 3 in which the intermediate accessory includes means whereby the topographic member may rotate about a vertical axis through the bench mark point.

10. A topographic bench mark unit as claimed in claim 3 in which the intermediate accessory includes a device for alignment with other points or bench marks by rotation about said vertical axis to determine the position of the points or bench marks.

11. A unit according to claim 3 in which the means for mounting the topographic members also includes a bayonet fitting between the accessory and said bench mark member in the case.

12. A topographic bench mark unit comprising a case having a back and defining internally a space; a lid providing access to the space; means for fixedly mounting said case on a surface of a support structure, said mounting means including means for rendering any tampering with the fixed mounting visible, a bench mark member integral with the back of said case and inside said space, said bench mark member having a cylindrical surface the axis of which passes through a bench mark point; means for identifying the bench mark point, and means for mounting a topographic member in a predetermined position in vertical alignment with the bench mark point defined by the bench mark member for producing measurements with reference to the bench mark point, said means for mounting the topographic member comprising a removable intermediate accessory between the topographic member and the case comprising a mounting member having a cylindrical surface complementary to and coaxial with the cylindrical surface of said bench mark member in the case, one of said cylindrical surfaces being mounted within the other, a stirrup, and means for rotatably mounting the stirrup on said mounting member for rotation relative to the cylindrical surface thereof about an axis of the latter and about a second axis perpendicular to the latter and coincident with it at the bench mark point when the intermediate accessory is so mounted.

13. A unit according to claim 12 in which the mounting member has an annular groove coaxial with its cylindrical surface, and an annular ring complementary to and mounted in the groove so as to rotate freely therein, the stirrup being mounted on the ring so as to pivot about the second axis.

14. A unit according to claim 13 including means for adjusting the position of the stirrup and the ring about respective axes of rotation.

15. A unit according to claim 14 in which the means for adjusting the position of the stirrup and the ring comprises a saddle mounted on the stirrup to be movable parallel to the second axis, a finger mounted on the saddle to be adjustable in a direction perpendicular to the second axis, the case having a notch for receiving the finger.

16. A topographic bench mark unit comprising;
a case defining internally a space; a lid providing access to the space; a support for fixedly mounting the case thereon the support including means for rendering any tampering with the fixed mounting visible; a bench mark member integral with the case inside the space; means for mounting a topographic member in a predetermined position vertical alignment with a bench mark point defined by the bench mark member, for producing measurements with reference to the bench mark point; means for identifying the bench mark point; the means for mounting having an aperture through a wall thereof normally in contact with the support; a fixing member including a rod receivable in the aperture through the wall, the rod having an end fixed to the support, the fixing member also including a head which engages the wall; and the means for rendering tampering with the fixed mounting visible comprising a plate covering the head of the fixing member, and attaching means for attaching the plate to the case so that the attaching means becomes ineffective in the event of relative displacement of the case and the fixing member.

17. A unit according to claim 16 in which the means for identifying the bench mark point is carried by the plate.

* * * * *